2 Sheets—Sheet 1.

W. C. DOUTHETT.
MOWING-MACHINE.

No. 170,665. Patented Dec. 7, 1875.

Witnesses
Granville Lewis
M. Church

Inventor
W. C. Douthett
By Hire & Ellsworth
His Attys.

2 Sheets—Sheet 2.

W. C. DOUTHETT.
MOWING-MACHINE.

No. 170,665. Patented Dec. 7, 1875.

WITNESSES

INVENTOR

UNITED STATES PATENT OFFICE.

WILLIAM C. DOUTHETT, OF SPRINGDALE, ASSIGNOR OF PART OF HIS RIGHT TO JESSE D. SNYDER, OF WILLIAMSPORT, AND JAMES E. KARNS, OF SPRINGDALE, PENNSYLVANIA.

IMPROVEMENT IN MOWING-MACHINES.

Specification forming part of Letters Patent No. 170,665, dated December 7, 1875; application filed March 12, 1875.

*To all whom it may concern:*

Be it known that I, WILLIAM C. DOUTHETT, of Springdale, in the county of Allegheny and State of Pennsylvania, have invented certain new and useful Improvements in Harvesters; and I do hereby declare the following to be a full, clear, and exact description of the same, reference being had to the accompanying drawings forming part of this specification, in which—

Figure 1:
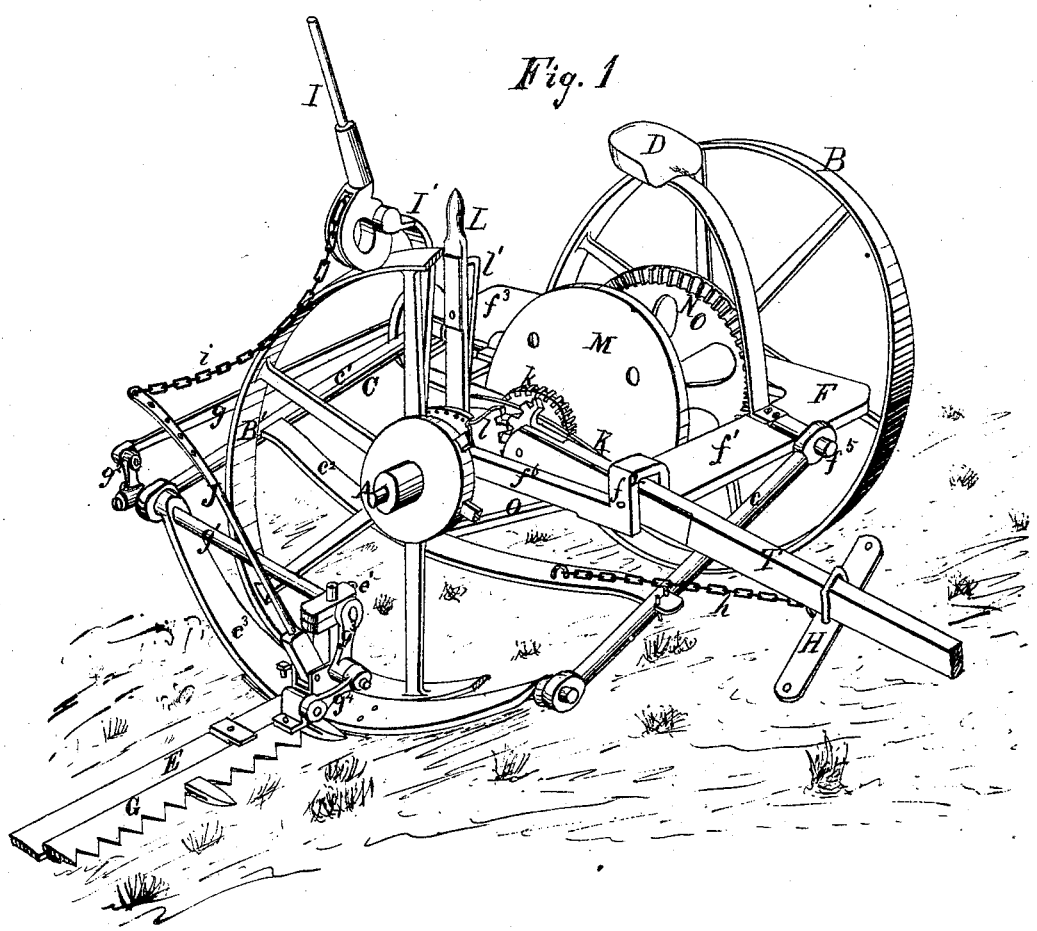
Figure 2:
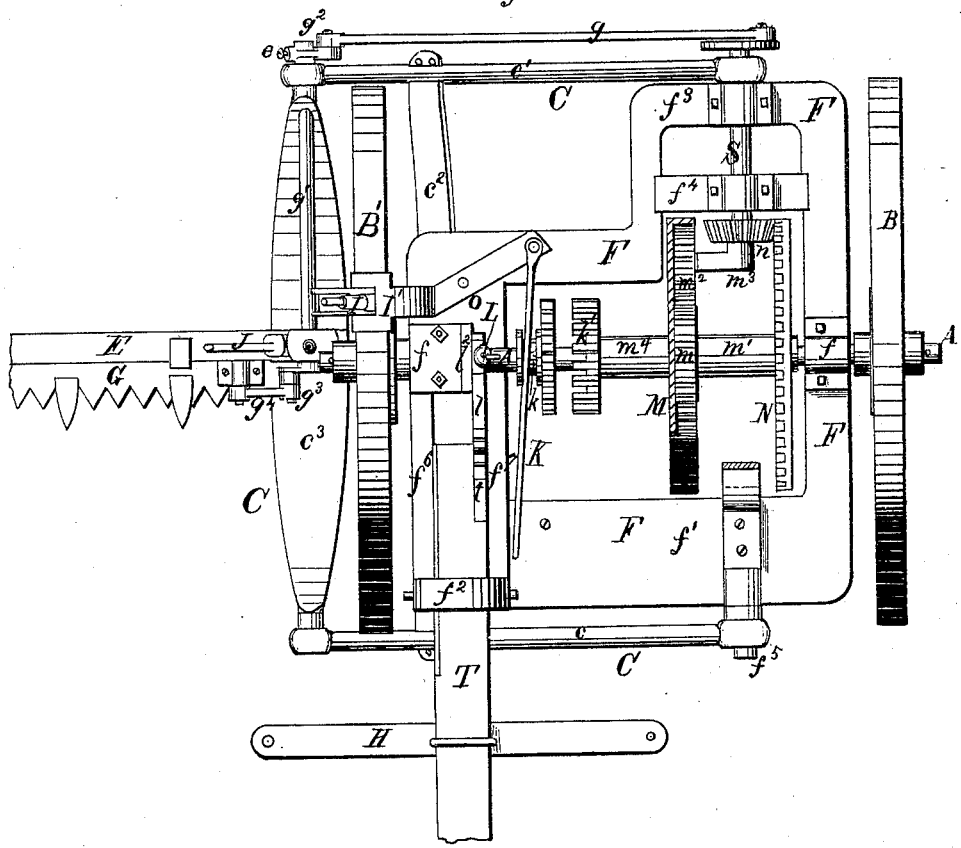
Figure 3:
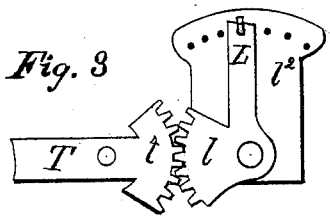

Figure 1 is a perspective view, portions of the wheel having been removed to reveal the construction of other parts. Fig. 2 is a top-plan view; and Fig. 3 is a view showing one mode of connecting the draft-bar or tongue with the lever that tilts the main frame.

Similar letters of reference in the accompanying drawings denote the same parts.

My improvements relate to that class of harvesting-machines known as "center-cut" harvesters; and have for their object, first, to increase the strength, durability, simplicity, and general efficiency of the machine; secondly, to improve the operation of the cutting apparatus, and secure a more perfect control over, and adjustability of, the cutter-bar; thirdly, to distribute the draft more equally, and prevent side draft; and, lastly, to counteract the side thrust of the driving-gear.

To these ends my invention consists, first, in a hinged frame, supported and pivoted near the left wheel, and extended around the right wheel, for the purpose of supporting the cutter-bar, in combination with the main frame, pivoted to the main axle, and a guide-bar, which holds the hinged frame in position, and relieves it of undue strain while it is rocking on its hinges; secondly, in combining with a downwardly-curved side piece, pivoted on trunnions at each end, a cutter-bar and a rock-shaft and pitman, by which the cutter-bar is operated; thirdly, in making the actuating crank or cranks of the cutting apparatus adjustable, in order to give greater range to the action of said cutting apparatus.

The machine in which these several improvements are here embodied, and which is shown in the drawings, is a "two-wheel" machine, in which both draft-wheels apply the power to drive the machinery, and are provided with "backing-ratchets," for the usual purposes. The main frame lies wholly between the two draft-wheels, is pivoted on or under the main axle, and is provided with a lever, engaging with the rear end of the tongue by means of toothed segments or other equivalent devices, by which said main frame can be tilted to and fixed at any required inclination on the axle. The shaft that drives the cutter is mounted on the main frame, near the left wheel, and in a line at right angles with the main axle, and is driven by the compound gearing above referred to, which can be thrown into or out of engagement with the axle, so as to operate therewith, or not to operate at all, as may be desired. The finger-bar and cutter-bar are supported by a hinged frame, to which the draft of the team is directly applied, said hinged frame being articulated to the main frame in line with the shaft that drives the cutter, and extending outside of the right wheel, which runs between two longitudinal beams thereof. The outer beam of the hinged frame is curved downward, so as to run on the ground ordinarily when the machine is in operation, although it may be raised at will to any required height, and the machine may be so run without interfering in any way with the proper action of the parts. The said outer curved beam is capable of tilting on its end trunnions, to allow the outer end of the finger-bar and cutter-bar to be raised to or beyond a vertical line with said trunnions, and secured at any such inclination as may be desired. The main frame and hinged frame, connected as aforesaid, may be so tilted and secured as to adjust the edge of the cutting apparatus at any required inclination to the grass, grain, or other material to be cut; and the draft is so applied as to tend to raise the cutting-edge of the cutter-bar, and counteract the tendency thereof to be drawn down by its action against the material upon which it is operating. All the parts are so constructed and combined that they can be adjusted and fixed in any position that may be required by the necessities of the work to be done.

In the drawings, A indicates the main axle, and B B' the main wheels. F is the main frame, supported on or under and pivoted to the axle at $ff$, provided with a foot-board, $f^1$; a driver's seat, D; a yoke or pair of lugs, $f^2$, to which the tongue T is pivoted; a rear extension, $f^3$, and cross-bar $f^4$, which accommodate the driving-shaft S; a projecting trunnion, $f^5$, in line with the driving-shaft; and a raised side beam, $f^6$, and similar parallel beam $f^7$ near it, between which two beams lies the rear end of the tongue, the lower end of the tilting-lever L, and the toothed segments that connect the tilting lever and tongue. C is the hinged frame, composed of a stout metal bar, $c$, articulated to the trunnion $f^5$, near the left wheel B, and extending beneath the tongue and beyond the right wheel B'; a similar metal bar, $c^1$, articulated to the driving-shaft S, near its rear end, and extending parallel to the other, but in rear of the wheel B'; a stout longitudinal metal bar, $c^2$, extending under the main frame and axle and connecting the two bars $c\ c^1$; and a flat downwardly-curved plate or beam, $c^3$, outside of the wheel B', and rocking upon trunnions or journals having their bearings in the outer ends of the bars $c\ c^1$. E is the finger-bar, rigidly attached to the middle of the curved beam or plate $c^3$. G is the cutter-bar, operated from the shaft S by means of a pitman, $g$, a rock-shaft, $g^1$, cranks $g^2\ g^3$, and a short connecting-rod, $g^4$. $e$ is a set-screw, by means of which the position of the crank $g^2$ upon the rock-shaft $g^1$ can be changed when necessary. $e'$ is a set-screw for the purpose of tightening up the rock-shaft bearing, and preventing lost motion or rattling of the shaft in its bearings. H is the whiffletree, so attached to the tongue that it can be slid forward and backward thereon, and connected by a chain or rod, $h$, to the bars $c$ or $c^2$, in order that the draft of the team may be applied directly to the hinged frame C, midway between the wheel B and the middle of the cutter-bar for the purpose of equalizing the draft and preventing side draft. O is a strong hooked bar extending from the front part of the main frame downward and backward to a point beneath the lowest part of the beam $c^2$, and thence up through a slot in said beam, or between lugs attached thereto, and terminating at its rear end in a slot in the rear part of the main frame, so that the hooked bar will be supported at both ends against longitudinal strain, and so that, being thus supported itself, it will serve to support the hinged frame also against any lateral strain upon its hinges, while, at the same time, it leaves said hinged frame free to rise and fall. I is a lever mounted upon a suitable standard, I', and connected by a chain, $i$, to a lever, J, articulated to the outer edge of the curved plate $c^3$. $l$ is a toothed segment affixed to or forming part of the lever L, and constructed to engage with a similar segment, $t$, on the rear end of the tongue, so that, by moving the handle of the lever forward or backward, the inclination of the main frame can be varied at will. $l^1$ is a spring-pawl or lock attached to the lever L, and in connection with a notched or perforated plate, $l^2$, attached to the frame, operating to lock the lever, and consequently the main frame, in any required position. K is a hand or foot lever, by which to operate the clutch $k\ k^1$ that effects the connection of the compound gear with the main axle, or its disconnection therefrom. M is a large internal gear-wheel mounted on a sleeve, $m^4$, and running on the main axle, so as to be connected to or disconnected from the same by means of the clutch $k$, as above described. $m$ is a small pinion attached to a sleeve, $m^1$, and mounted on the main axle inside of the gear-rim of the wheel M. $m^2$ is a small pinion mounted on a right-angled stud, $m^3$, projecting from the under side of the cross-bar $f^4$, and arranged to communicate motion from the large gear-wheel M to the small central wheel $m$ and its sleeve $m^1$. N is a large crown-wheel attached to the sleeve $m^1$ so as to rotate therewith; and $n$ is a pinion on the end of the shaft S, receiving motion from the wheel N and transmitting the same to the cutting mechanism. The gear-wheels may all be covered and protected by a suitable cap or box.

I do not restrict myself to the precise details of form and construction herein shown and described, but desire to be at liberty to vary the same, as circumstances may require, while retaining the general principles of operation, as set forth. I construct the curved plate $c^3$ substantially in the arc of a circle, so that, as the main frame is adjusted to different inclinations in order to regulate the inclination of the edge of the cutter to the grass, &c., the bearing of the curved plate or inner shoe upon the ground will not be affected, and the actual height of the center of the cutter-bar from the ground will not be varied. I make the pitman $g$ of a length exactly equal to the shortest distance between the centers of the two shafts S and $g^1$, the effect of which is that it will operate the cutting mechanism with equal ease at every possible inclination of the hinged frame or the cutter, as well as at every possible inclination of the main frame. The cutting mechanism will work easily at an inclination of forty-five degrees or more to the horizon, and if it is desired to operate it nearly in a vertical position, as for trimming hedges, &c., the cramping of the pitman or connecting-rod $g^4$ at the heel of the cutter-bar can be easily prevented by slightly changing the position of the crank $g^2$ upon its shaft, as above referred to.

My improved machine has important advantages, among which may be specified the following: While the machine is in operation the cutter may be allowed to float freely over the ground no matter how uneven the latter may be, or it may be raised horizontally and set at any practicable height by fixing the lever by which it has been raised, or its inner end may be raised or lowered to any desired extent, or its outer end raised or lowered to any desired extent, by manipulating the lever by which it is operated, or its cutting-edge tilted to any required inclination up or down by adjusting the pivoted main frame, any one or all of these adjustments being made at will by the attendant without stopping the machine or arresting its operation for a single moment, and without involving any other adjustment or change unless the latter be desired. With the proper adjustment the machine will operate perfectly with the cutter raised to any height or to any inclination, and even in a vertical position. A single lever by a single movement raises the cutter-bar to any desired inclination or height, the first part of the movement operating to raise its outer end, and the last part of the movement to elevate the whole bar. The draft is so applied as, first, to be equalized between the left wheel and the cutting apparatus; and, secondly, to tend to draw or tilt up the cutting-edge of the knife, thereby counteracting the tendency of the grass, &c., to draw said edge downward. The same construction causes the main frame at all times to retain its proper balance on the axle and prevents the machine from dragging down on the team.

The gear that actuates the cutter is mounted upon a sleeve upon the main axle in such a manner that the usual side thrust of the driving upon the driven pinion is obviated, and thereby the sleeve which supports the gear-wheels upon the main axle is prevented from binding and causing undue friction.

I claim as my invention—

1. The hinged frame C, combined with the main frame and with the guiding and supporting-bar O, substantially as and for the purpose described.

2. The downwardly-curved plate $c^3$, combined with the rock-shaft $g^1$, pitman $g$, and cutter, substantially as described.

3. The adjustable crank $g^2$, combined with the pitman, the rock-shaft, and the cutter, substantially as and for the purpose described.

WILLIAM C. DOUTHETT.

Witnesses:
N. K. ELLSWORTH,
E. S. KARNER.